United States Patent [19]

Marquez

[11] 4,336,051

[45] Jun. 22, 1982

[54] PROCESS FOR THE PRODUCTION OF A SOIL IMPROVING COMPOSITION

[76] Inventor: Juan U. Marquez, Alabama No. 200 Col., Napoles Mexico 18, D. F., Mexico

[21] Appl. No.: 219,582

[22] Filed: Dec. 23, 1980

[30] Foreign Application Priority Data

Mar. 10, 1980 [MX] Mexico .................................... 8701

[51] Int. Cl.$^3$ ............................................. C05F 11/08
[52] U.S. Cl. ............................................. 71/6; 71/9; 71/23; 71/64.1; 435/253; 210/612
[58] Field of Search .......................... 71/1, 5, 6, 8–10, 71/11, 23, 64.8, 64.9, 64.10; 210/606, 610–612; 435/42, 174, 175, 253

[56] References Cited

U.S. PATENT DOCUMENTS 4,032,318 6/1977 Lovness .......................... 435/253 X
4,119,429 10/1978 Lovness ................................. 71/6

FOREIGN PATENT DOCUMENTS 12670 6/1980 France ..................................... 71/23
596563 2/1978 U.S.S.R. ................................. 71/23

Primary Examiner—S. Leon Bashore, Jr.
Assistant Examiner—Ferris H. Lander
Attorney, Agent, or Firm—Holman & Stern

[57] ABSTRACT

A process for producing a soil improving composition comprising fermenting gelidium type marine algae with various nutrients and regulating agents, the product of this process, and the application of this product to depleted farmland.

8 Claims, No Drawings

PROCESS FOR THE PRODUCTION OF A SOIL IMPROVING COMPOSITION

BACKGROUND OF THE INVENTION

One of the main problems which farmers encounter in their fields is the exhaustion that the land suffers as a result of the practice of monoculture or due to physical factors which cause erosion of the farmland. As a measure to prevent the exhaustion or wasting of such farmland, numerous techniques have been practiced, which range from the disposition or arrangement of the furrows to avoid erosion caused by wind, crop rotation, etc., to the use of fertilizers which supply the nutrients which the crops absorb, combined with the use of improved seeds, such as hybrids.

When farmers say that their land is "exhausted", they mean that the yield of their fields is too low and of poor quality. This is due mainly to the absence of organic matter, which has been consumed by the previous crops, that is, the depletion of vital nutrients such as phosphorus, magnesium, potassium and nitrogen compounds, causing a disequilibrium in the nutritional balance of the ground responsible for bearing new crops, this being detected by the reduction of the top soil or humus on the farmland.

SUMMARY OF THE INVENTION:

The present invention relates to a multi-step process for the production of a soil composition which will improve farmland. In the first step, a mixture of water, an algae, malt, sucrose, molasses, and magnesium sulfate in specified quantities is maintained at specified temperatures for several days. In the second step, ammonium sulfate, propanetriol and sodium tetradecyl sulfate (industrial grade and/or medical grade of 85% minimum purity) are added in specified quantities and the mixture is permitted to ferment for about 6 to 10 days, to yield the soil composition of this invention. The soil improving composition of this invention may then be applied to farmland, in any conventional manner and amount.

DESCRIPTION OF THE PREFERRED EMBODIMENTS

The process of this invention relies upon enzymes for the production of the soil composition. Enzymes are definite chemical substances, protein in nature, which are formed in the living cells of plants such as the algae used in this invention, and which are necessary catalysts for the chemical reactions of biological processes. Enzymes are usually very specific in their catalytic behaviour in that a given enzyme is effective for only one particular reaction.

Enzymes are utilized in the soil improving composition of this invention, and are formed when the ingredients are mixed under the specified conditions. The enzymes, which form the principal active ingredient of the soil improving composition of this invention, will in large measure simplify the problem of the exhaustion of farm soils and in some cases the problem of the sterility in general of the ground, as they bring about a series of reactions or favorable modifications of the ground, such as the regularization of the micro areas which support the microbic flora. These are of vital importance since they carry out redox reactions of nitrogen salts, phosphorus salts, magnesium salts, etc. Moreover, when this type of flora predominates, the growth of pathogenic bacteria is abated.

The use of enzymes introduces a new concept in soil conditioning, affording a proper nitrogenated mineral balance, greater uniformity of ground moisture, and aeration of the soil, even in the absence of sufficient humus or top soil.

The procedure for the production of the soil improving composition is as follows. All quantities are percentages by weight based upon the total weight of the ingredients.

Step I

Water (23-27%) is charged to a mixing vessel and heated to from 70° to 80° C., preferably about 74° C. Gelidium type marine algae (5-8%), diastatic malt type C (5-8%), sucrose (6-9%), molasses (6-9%), and magnesium sulfate—technical grade (5-8%) are then added. The mixture is then maintained at a temperature of 70°-80° C. under vigorous agitation for about 24 hours. The mixture is then recirculated while maintaining the agitation and same temperature, for about an additional 48 hours. Diastatic malt type C is also known as gamma-amylase.

Step II

Ammonium sulfate (6-10%), 1,2,3,-propanetriol (12-18%), sodium tetradecyl sulfate—industrial grade (6-10%) and sodium tetradecyl sulfate—medicinal grade (6-10%) are then added while maintaining the agitation and recirculation, for a period of time sufficient completely to homogenize the ingredients, thus completing the fermenting of the composition.

Step III

The homogenized mixture is then transferred to a second vessel or pit, open to the atmosphere, in which the mixture is left standing for from 6 to 10 days, while maintaining the mixture at a temperature of from about 50° to about 55° C., preferably about 50° C. At the end of this time, a liquid composition is formed having a density higher than that of water. The composition thus prepared is ready for immediate use, without further processing.

Application of the Composition

The composition of this invention may be applied to the soil by any known method. However, two particular methods are particularly useful.

Spraying

The composition may be sprayed on the soil, after it is diluted with water in about a 1:1 ratio. Typically, the aqueous dilution is charged to a pressure vessel mounted to the rear of a tractor and sprayed in a fan-like pattern at a pressure of 8 to 14 psig. The composition is applied in an amount of from about 150 to about 240 liters per hectare, preferably at about 200 liters per hectare, calculated from the undiluted composition.

Irrigation

The composition may be added to irrigation water flowing through conventional irrigation ditches. Typically, the composition is added at the primary water source at a ratio of 1 liter of composition to from about 500 to about 1,000 liters of water. The composition is added until the amount applied per hectare is the same as when spraying.

The composition of this invention, when applied to soil in the above manner, results in the following improvements.

1. Control of the quantity of ground moisture to an amount most beneficial to crops.
2. Stabilization of the soil's mineral balance (trace elements).
3. Control of the process of photosynthesis by activating the citrochromatic system, due to the emission of existing electrons originating from redox reactions.
4. Acceleration of the penetration of irrigation and rain water, permitting its better diffusion through the soil.
5. Increasing the soil's microbic flora, especially nitrogen-fixing bacteria.
6. Maintainance of loose soil, resisting compaction.
7. Control of the soil pH by avoiding the concentration of sodium which is one of the principal elements responsible for salinity, by causing ionization reactions due to the dipole of the enzyme.

I claim:

1. A process for the production of a soil improving composition comprising:
    (a) mixing 23–27% water, 5–8% gelidium type algae, 5–8% diastatic malt type C, 6–9% sucrose, 6–9% molasses, and 5–8% magnesium sulfate at a temperature of about 70° to 80° C. for about 24 hours;
    (b) recirculating the mixture for about 48 hours while mixing and maintaining it in the same temperature range;
    (c) adding 6–9% ammonium sulfate, 12–18% 1,2,3,-propanetriol, 6–10% sodium tetradecyl sulfate—industrial grade, and 6–10% sodium tetradecyl sulfate—medicinal grade, while maintaining the mixing, recirculation, and temperature range for a period of time sufficient to homogenize the ingredients; and
    (d) permitting the homogenized mixture to stand, open to the atmosphere, for from 6 to 10 days, while maintaining it at a temperature of from 50° to 55° C., until the composition of this invention is formed; all percentages being by weight.

2. The process of claim 1 wherein: the water is first charged to a mixing vessel and heated before the other ingredients of step (a) are added; all mixing in steps (a), (b), and (c) is by vigorous agitation; and step (d) is conducted in a second vessel.

3. The product of the process of claim 1 or 2.

4. A method of improving soil comprising applying an agriculturally effective amount of the product of claim 3 to depleted farmland.

5. The method of claim 4 wherein application is by adding the composition to the primary water source in irrigation ditches at a ratio of 1 liter of undiluted composition to from about 500 to about 1,000 liters of water, so that the amount of undiluted composition applied per hectare is from about 150 to about 240 liters.

6. The method of claim 5 wherein about 200 liters of composition are applied per hectare.

7. The method of claim 4 wherein application is by spraying the composition, diluted with water in about a 1:1 ratio, so that the amount of undiluted composition applied per hectare is from about 150 to about 240 liters.

8. The method of claim 7 wherein about 200 liters of composition are applied per hectare.

* * * * *